United States Patent
Van Dijk et al.

(10) Patent No.: US 7,392,453 B2
(45) Date of Patent: Jun. 24, 2008

(54) EMBEDDING AUXILIARY DATA IN AN INFORMATION SIGNAL

(75) Inventors: Marten Erik Van Dijk, Eindhoven (NL); Franciscus Maria Joannes Willems, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1133 days.

(21) Appl. No.: 10/477,491

(22) PCT Filed: May 15, 2002

(86) PCT No.: PCT/IB02/01702

§ 371 (c)(1),
(2), (4) Date: Nov. 12, 2003

(87) PCT Pub. No.: WO02/093572

PCT Pub. Date: Nov. 21, 2002

(65) Prior Publication Data

US 2005/0175110 A1     Aug. 11, 2005

(30) Foreign Application Priority Data

May 15, 2001  (EP) .................................. 01201778

(51) Int. Cl.
*H03M 13/11* (2006.01)
*H03M 13/31* (2006.01)

(52) U.S. Cl. ....................................... 714/752; 714/778
(58) Field of Classification Search .................. 714/752, 714/778
See application file for complete search history.

(56) References Cited

U.S. PATENT DOCUMENTS

| | | | | | |
|---|---|---|---|---|---|
| 4,821,270 | A | * | 4/1989 | Mauge | 714/798 |
| 4,847,705 | A | * | 7/1989 | Weng et al. | 360/49 |
| 5,237,574 | A | * | 8/1993 | Weng | 714/755 |
| 5,371,750 | A | * | 12/1994 | Inoue et al. | 714/755 |
| 5,428,630 | A | * | 6/1995 | Weng et al. | 714/763 |
| 5,528,607 | A | * | 6/1996 | Weng et al. | 714/775 |
| 5,553,067 | A | * | 9/1996 | Walker et al. | 370/390 |
| 6,052,820 | A | * | 4/2000 | Yoshida | 714/781 |

(Continued)

FOREIGN PATENT DOCUMENTS

EP           0359325           3/1990

(Continued)

*Primary Examiner*—Stephen M. Baker

(57) ABSTRACT

Information signals such as grayscale images or audio signals are represented as a sequence of PCM signal samples. To embed auxiliary data in the least significant bits of the signal, the samples are slightly distorted. There is a so-termed "rate-distortion function" (20) which gives the largest embedding rate R given a certain distortion level D. It appears that the efficiency of prior art embedding schemes such as LSB replacement (21,22) can be improved. The invention discloses such embedding schemes (23,24). According to the invention, the signal is divided into groups of L (L>1) signal samples (x). For each group of signal samples, a vector of least significant portions (x mod n) of the signal samples is created. For n=2, the vector comprises the least significant bit of each signal sample. The syndrome of said vector (as defined in the field of error detection and correction) represents the embedded data. Only one (or a few, in any case less than L) signal sample(s) of a group needs to be modified so as to achieve that the vector assumes a desired syndrome value.

10 Claims, 2 Drawing Sheets

U.S. PATENT DOCUMENTS

| | | | |
|---|---|---|---|
| 6,463,564 B1 * | 10/2002 | Weng | 714/784 |
| 6,792,542 B1 * | 9/2004 | Lee et al. | 726/1 |
| 7,076,660 B2 * | 7/2006 | Newman | 713/176 |
| 7,174,497 B2 * | 2/2007 | Baggen et al. | 714/776 |

FOREIGN PATENT DOCUMENTS

| | | |
|---|---|---|
| EP | 0205200 | 8/1990 |
| JP | 11274569 | 10/1999 |

* cited by examiner

EMBEDDING AUXILIARY DATA IN AN INFORMATION SIGNAL

FIELD OF THE INVENTION

The invention relates to a method and arrangement for embedding auxiliary data in an information signal. The invention also relates to a method and arrangement for detecting said auxiliary data.

BACKGROUND OF THE INVENTION

A known method of embedding auxiliary data in a PCM-coded information signal, also referred to as fragile watermarking, is disclosed in European Patent EP-B 0 205 200. In this prior-art method, the least significant bit of every $n^{th}$ signal sample is replaced by an auxiliary data bit. An improved variant of this embedding scheme is disclosed in European Patent Application EP-A 0 359 325. The least significant bit of a PCM sample is herein modified, depending not only on the actual auxiliary data bit, but also on one or more other bits of the same PCM sample.

OBJECT AND SUMMARY OF THE INVENTION

It is an object of the invention to further improve the method of embedding auxiliary data in a PCM signal.

According to the invention, this is achieved by the method as defined in claim 1. The method leads to an improvement of the rate-distortion ratio.

DESCRIPTION OF EMBODIMENTS

Figure 1:
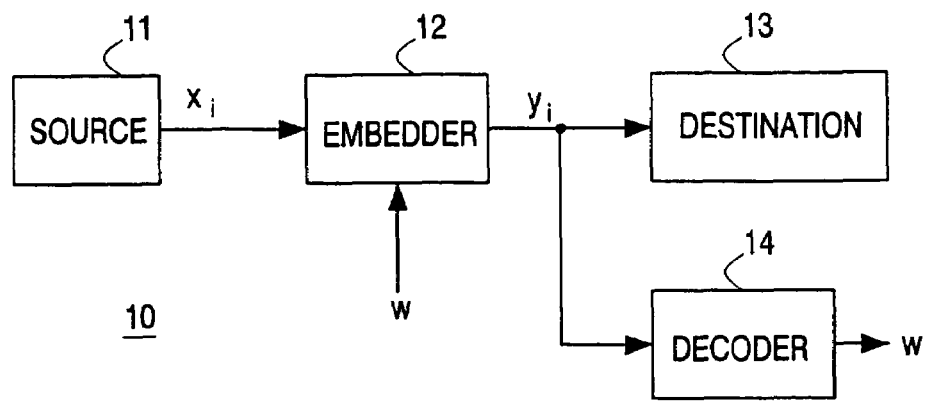
FIG. 1 shows a general schematic diagram of an auxiliary data embedding and decoding system.

FIG. 1 shows a general schematic diagram of an auxiliary data embedding and decoding system 10. A discrete memoryless source 11 emits a host sequence x of symbols $x_1 \ldots x_N$. An encoder 12, also referred to as embedder, receives a message w of symbols $0 \ldots M$ with probability $1/M$. The embedder modifies the sequence $x_1 \ldots x_N$ into a composite sequence of symbols $y_1 \ldots y_N$ as a function of x and w. The composite sequence y is applied to a destination 13, and is also observed by a decoder 14 which is required to reconstruct the embedded message w reliably.

In the prior-art embedding method mentioned in the opening paragraph, one half of the host signal symbols is not modified because the least significant bit of the PCM sample is already equal to the data bit to be embedded. The other half of the symbols is modified by flipping the least significant bit to make said bit equal to the data bit to be embedded. The modified symbol thus differs by +1 or −1 from the host PCM sample. This is summarized in the following Table I.

TABLE I

|  | w = 0 | w = 1 |
| --- | --- | --- |
| $x_i = \ldots 0$ | $y_i = x_i$ | $y_i = x_i + 1$ |
| $x_i = \ldots 1$ | $y_i = x_i - 1$ | $y_i = x_i$ |

The modification of host symbols introduces distortion. For PCM encoded information signals (such as audio samples, image pixels), the "squared error" is often used, defined as:

$$D(x,y) = (y-x)^2$$

The average distortion of the prior-art embedding scheme is:

$$D = \frac{1}{4}\{0^2 + (+1)^2 + (-1)^2 + 0^2\} = \frac{1}{4}(2 \cdot 0^2 + 2 \cdot 1^2) = 0.5.$$

The embedding rate of the prior-art embedding scheme is R=1 bit/symbol, and the rate-distortion ratio is therefore R/D=2.

The prior-art embedding method is a species of least-significant bits replacement, in which the message is embedded in the R least significant bits (R is a positive integer) of the signal symbols. The following Table IIa shows the least-significant bit replacement scheme for R=2.

TABLE IIa

|  | w = 00 | w = 01 | w = 10 | w = 11 |
| --- | --- | --- | --- | --- |
| $x_i = \ldots 00$ | $y_i = x_i$ | $y_i = x_i + 1$ | $y_i = x_i + 2$ | $y_i = x_i + 3$ |
| $x_i = \ldots 01$ | $y_i = x_i - 1$ | $y_i = x_i$ | $y_i = x_i + 1$ | $y_i = x_i + 2$ |
| $x_i = \ldots 10$ | $y_i = x_i - 2$ | $y_i = x_i - 1$ | $y_i = x_i$ | $y_i = x_i + 1$ |
| $x_i = \ldots 11$ | $y_i = x_i - 3$ | $y_i = x_i - 2$ | $y_i = x_i - 1$ | $y_i = x_i$ |

In this case, the average distortion is:

$$D = \frac{1}{16}(4 \cdot 0^2 + 6 \cdot 1^2 + 4 \cdot 2^2 + 2 \cdot 3^2) = 2.5$$

and the rate-distortion ratio is R/D=0.8.

Note that in the R=2 embedding scheme of Table IIa, the two least significant bits of host symbols are replaced by a 2-bit message w. As the Table shows, this may lead to a distortion of $D=3^2$ per symbol. Obviously, it is better to subtract 1 from a sample instead of adding 3. For R=2, this strategy is summarized in the following Table IIb.

TABLE IIb

|  | w = 00 | w = 01 | w = 10 | w = 11 |
| --- | --- | --- | --- | --- |
| $x_i = \ldots 00$ | $y_i = x_i$ | $y_i = x_i + 1$ | $y_i = x_i \pm 2$ | $y_i = x_i - 1$ |
| $x_i = \ldots 01$ | $y_i = x_i - 1$ | $y_i = x_i$ | $y_i = x_i + 1$ | $y_i = x_i \pm 2$ |
| $x_i = \ldots 10$ | $y_i = x_i \pm 2$ | $y_i = x_i - 1$ | $y_i = x_i$ | $y_i = x_i + 1$ |
| $x_i = \ldots 11$ | $y_i = x_i + 1$ | $y_i = x_i \pm 2$ | $y_i = x_i - 1$ | $y_i = x_i$ |

In this case, the distortion is:

$$D = \frac{1}{16}(4 \cdot 0^2 + 8 \cdot 1^2 + 4 \cdot 2^2) = 1.5$$

and the rate-distortion ratio is R/D=1.33, which is considerably better than the ratio R/D=0.8 of the scheme which is shown in Table IIa.

The inventors have found a theoretically realizable rate-distortion curve, which shows that there must be embedding schemes that have a better rate-distortion ratio. This "boundary" curve is denoted 20 in FIG. 2. The two (R,D) pairs (1, 0.5) and (2, 1.5) corresponding to Tables I and IIb are denoted 21 and 22, respectively, in this Figure. As will be appreciated, there is room for improving the rate-distortion ratio. For example, a distortion D≈0.2 can theoretically be achieved for R=1 (R/D≈5), and a distortion D≈0.9 can theoretically be achieved for R=2 (R/D≈2). We are interested in finding embedding strategies that combine a large embedding rate R with a small distortion D, i.e. a large rate-distortion ratio R/D.

"Coded" LSB Modulation

According to a first aspect of the invention, the message symbols are represented by the syndrome of a vector formed by the least significant bit of each one of a group of L (L>1) host symbols, hereinafter also referred to as LSB vector. The expression "syndrome" is a well-known notion in the field of error correction. In error correction schemes, a received data word (the input vector) is processed to obtain its syndrome. Usually (bot not necessarily), said processing implies multiplication of the data word with a given matrix. If the syndrome is zero, all bits of the data word are correct. If the syndrome is unequal to zero, the non-zero value represents the position (or positions) of erroneous bits. Hamming codes have Hamming distance 3 and thus allow 1 erroneous bit to be corrected. Other codes, such as Golay codes allow plural bits of a data word to be corrected.

In a mathematical sense, the data embedding method in accordance with the invention resembles error correction. In order to embed a number of data bits in a group of L host symbols, the encoder (12 in FIG. 1) modifies one or more host symbols of said group. Mathematically, an output vector $y_1 \ldots y_L$ is computed which is closest to $x_1 \ldots x_L$ in a Hamming-sense. The decoder (14 in FIG. 1) merely needs to determine the syndrome of the received LSB vector. The syndrome represents the embedded auxiliary data.

In the following example, the (7,4,3) Hamming code is used for embedding data in the least significant bit of host symbols. In the field of error correction, the (7,4,3) Hamming code allows 1 bit in 7-bit data words to be corrected (Hamming distance is 3) using 7−4=3 parity bits. In analogy herewith, the embedding embodiment allows 3 message bits to be embedded in 7 host symbols. To compute the syndrome, the LSB vector of the 7 host symbols is multiplied (all mathematical operations are modulo-2 operations) with the following 3×7 matrix:

$$\begin{bmatrix} 0 & 0 & 0 & 1 & 1 & 1 & 1 \\ 0 & 1 & 1 & 0 & 0 & 1 & 1 \\ 1 & 0 & 1 & 0 & 1 & 0 & 1 \end{bmatrix}$$

The columns of this matrix include all possible bit combinations except 000.

Assume that the seven host symbols have least significant bits 0, 0, 1, 1, 0, 1, 0, i.e. the input LSB vector is (0011010). The modulo-2 multiplication of this vector with the above matrix yields:

$$\begin{bmatrix} 0 & 0 & 0 & 1 & 1 & 1 & 1 \\ 0 & 1 & 1 & 0 & 0 & 1 & 1 \\ 1 & 0 & 1 & 0 & 1 & 0 & 1 \end{bmatrix} \times \begin{bmatrix} 0 \\ 0 \\ 1 \\ 1 \\ 0 \\ 1 \\ 0 \end{bmatrix} = \begin{bmatrix} 0 \\ 0 \\ 1 \end{bmatrix}$$

The output of this multiplication (001) is the syndrome of the input vector (0011010). It is this syndrome which represents the embedded message symbol.

Obviously, the syndrome represented by the original host symbols is generally not the message symbol to be embedded. The least significant bit of only one of the host symbols must therefore be modified. This is achieved by the following steps:

Compute the difference between the syndrome of the original LSB vector and the message to be embedded. If, for example, the message to be embedded is (010), the modulo-2 difference is (010)−(001)=(011).

Determine the column position d of the difference in the matrix. In this example, the difference (011) is found in the third (d=3) column of the matrix.

Modify the least significant bit of the d-th host symbol.

The least significant bit of the $3^{rd}$ host symbol is thus modified in the present example, which results in a modified vector (0001010). In the decoder, this vector is subjected to syndrome determination. The result is:

$$\begin{bmatrix} 0 & 0 & 0 & 1 & 1 & 1 & 1 \\ 0 & 1 & 1 & 0 & 0 & 1 & 1 \\ 1 & 0 & 1 & 0 & 1 & 0 & 1 \end{bmatrix} \times \begin{bmatrix} 0 \\ 0 \\ 0 \\ 1 \\ 0 \\ 1 \\ 0 \end{bmatrix} = \begin{bmatrix} 0 \\ 1 \\ 0 \end{bmatrix}$$

which indeed represents the message symbol (010).

The distortion per 7 symbols is $$\frac{1}{8} \cdot 0^2 + \frac{7}{8} \cdot 1^2 = \frac{7}{8}$$

(probability ⅛ that none of the host symbols is changed and probability ⅞ that one symbol is changed by ±1), so that the average distortion per symbol is D=⅛. The embedding rate is 3 bits per 7 symbols, i.e. R=3/7. The corresponding (R,D)—pair is shown as a + sign denoted 23 in FIG. 2. The rate-distortion ratio is R/D≈3.4.

More generally, the embedding based on Hamming codes allows embedding of m-bit message symbols into $2^m-1$ host symbols with embedding rate $$R = \frac{m}{2^m - 1},$$

and distortion $$D = \frac{1}{2^m}.$$

Figure 2:
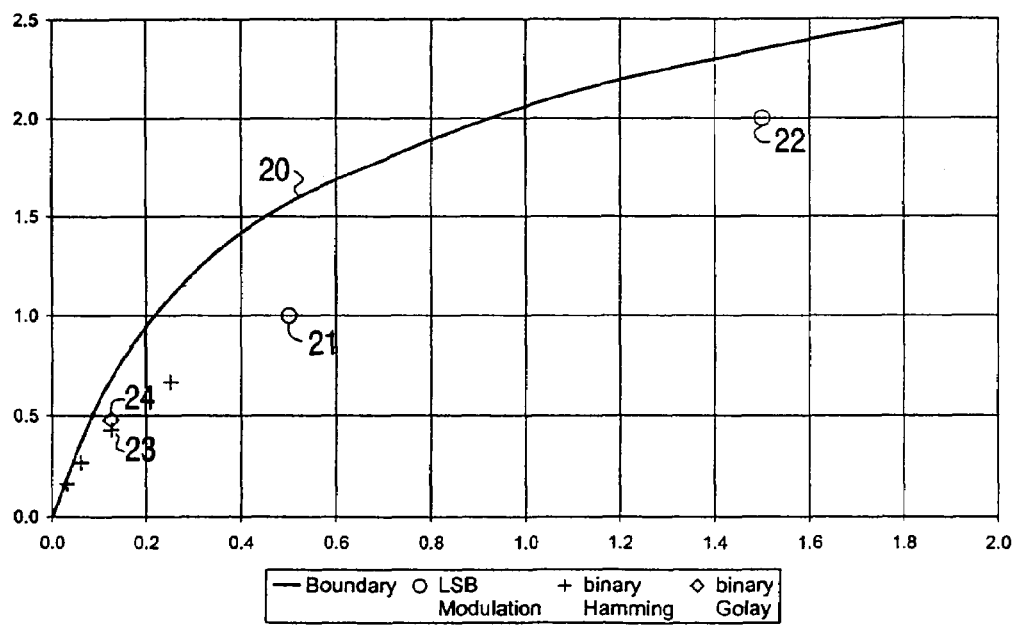
FIGS. 2, 3 and 4 shows graphs to illustrate the operation of embodiments of the embedding method according to the invention.

The (R,D)-pairs corresponding to m=2, 3, 4 and 5 are shown as + signs in FIG. 2. The rate-distortion ratio is $$R/D = \frac{m \cdot 2^m}{2^m - 1},$$

which is approximately equal to m for large m. For m=10, the ratio is roughly a factor 5 larger than low-bit modulation. This significant improvement is achieved with moderate complexity of the embedding and decoding hardware or software.

Instead of the binary Hamming code, a Golay code can be used. There is one binary Golay code: the (23,12,7) Golay code. In the field of error correction code, the Golay code can detect and correct 3 erroneous bits (Hamming distance 7) in 23-bit data words having 12 information bits and 23−12=11 protection bits. In analogy herewith, the (23,12,7) Golay code can embed 11 data bits in 23 host symbols by modifying max 3 symbols. Application of the Golay code leads to:

$$R = \frac{11}{23} \approx 0.478, \text{ and}$$

$$D = \frac{\binom{23}{1} \cdot 1 + \binom{23}{2} \cdot 2 + \binom{23}{3} \cdot 3}{2048 \cdot 23} \approx 0.124.$$

The corresponding (R,D) pair is indicated by a ◇ sign denoted 24 in FIG. 2. The rate-distortion ratio is R/D≈3.85, which is almost a factor 2 better than what can be achieved with LSB modulation.

Ternary Embedding Methods

According to a second aspect of the invention, the message symbols are represented by the so-termed "class" of host symbols. A symbol x is said to be in "class w" if x mod 3=w for w=0,1,2. In other words:

the PCM values 0, 3, 6, . . . (class 0) represent message symbol w=0, the PCM values 1, 4, 7, . . . (class 1) represent message symbol w=1, and the PCM values 2, 5, 8, . . . (class 2) represent message symbol w—2.

The data embedder 12 (see FIG. 1) now modifies an input symbol $x_i$ such that the modified symbol $y_i$ is class w. This is also referred to as "low-trits modulation". The following Table III shows this embedding scheme for host symbols $x_i$=9, 10, and 11.

TABLE III

| | w = 0 | w = 1 | w = 2 | w = 0 | w = 1 | w = 2 |
|---|---|---|---|---|---|---|
| $x_i = 9$ | $y_i = 9$ | $y_i = 10$ | $y_i = 8$ | D = 0 | D = 1 | D = 1 |
| $x_i = 10$ | $y_i = 9$ | $y_i = 10$ | $y_i = 11$ | D = 1 | D = 0 | D = 1 |
| $x_i = 11$ | $y_i = 12$ | $y_i = 10$ | $y_i = 11$ | D = 1 | D = 1 | D = 0 |

The embedding rate is R=log$_2$ 3≈1.585, and the average distortion rate is D=⅑·6=⅔. The corresponding (R,D)-pair is shown as a ◇ sign denoted 30 in FIG. 3 (for ease of reference, the boundary 20 and (R,D) pairs 21 and 22 shown in FIG. 2 are also shown in this Figure). The rate-distortion ratio is R/D≈2.378 which is quite good.

The above-mentioned form of ternary embedding, in which each host symbol has data embedded is referred to as "uncoded" ternary modulation. Again, however, it is possible to perform "coded" ternary modulation, in a similar manner as described hereinbefore with respect to "coded" LSB modulation, i.e. by embedding ternary symbols in groups of host symbols. It is again also possible to do this by using (ternary) Hamming codes or a (ternary) Golay code.

The embedding operation using a ternary Hamming code with m=2 parity checks will now be shown in more details. According to the principles set out above for binary Hamming codes, one would expect the matrix to have $3^m-1=8$ columns (all combinations except 00). However, columns being multiples of other columns need not be included in the matrix. Accordingly, the number of columns is $(3^m-1)/2=4$. This is also the number of host symbols forming a vector. The matrix is:

$$\begin{bmatrix} 0 & 1 & 1 & 1 \\ 1 & 0 & 1 & 2 \end{bmatrix}$$

This ternary Hamming code allows two ternary message symbols to be accommodated in groups of 4 host symbols having respective classes 1, 2, 0, and 1. The syndrome of the host vector (1,2,0,1) is (note that all mathematical operations are now modulo-3):

$$\begin{bmatrix} 0 & 1 & 1 & 1 \\ 1 & 0 & 1 & 2 \end{bmatrix} \times \begin{bmatrix} 1 \\ 2 \\ 0 \\ 1 \end{bmatrix} = \begin{bmatrix} 0 \\ 0 \end{bmatrix}$$

We want to embed two ternary symbols (1,2) in this group of host symbols. The difference is (1,2)−(0,0)=(1,2). The difference can be found in the 4$^{th}$ column of the matrix. Accordingly, the 4$^{th}$ host symbol is modified. If the difference is found in the matrix, the relevant host symbol is modified by adding 1 to its original PCM value. The group of host symbols is thus modified into (1,2,0,2). In the decoder, this vector is subjected to syndrome determination. The result is:

$$\begin{bmatrix} 0 & 1 & 1 & 1 \\ 1 & 0 & 1 & 2 \end{bmatrix} \times \begin{bmatrix} 1 \\ 2 \\ 0 \\ 2 \end{bmatrix} = \begin{bmatrix} 1 \\ 2 \end{bmatrix}$$

which indeed represents the message symbols (1,2).

If we want to embed the ternary symbols (2,2) in the group of host symbols, the difference is (2,2)−(0,0)=(2,2). There is no column having this value in the matrix, because (2,2) is a multiple of (1,1). This value (1,1) can be found in the 3$^{rd}$ column of the matrix. Accordingly, the 3$^{rd}$ symbol is modified, but now the modification involves adding 2 to (or subtracting 1 from) the respective PCM value rather than adding 1. The group of host symbols is thus modified into (1,2,2,1). In the decoder, this vector is subjected to syndrome determination. The result is:

$$\begin{bmatrix} 0 & 1 & 1 & 1 \\ 1 & 0 & 1 & 2 \end{bmatrix} \times \begin{bmatrix} 1 \\ 2 \\ 2 \\ 1 \end{bmatrix} = \begin{bmatrix} 2 \\ 2 \end{bmatrix}.$$

which indeed represents the message symbols (2,2).

Generally, when Hamming codes are used with a given number m of parity check symbols, the code word length is $(3^m-1)/2$. Therefore:

$$R = \frac{m \cdot \log_2 3}{(3^m - 1)/2},$$

$$D = \frac{2}{3^m}, \text{ and}$$

$$R/D = \frac{m \cdot 3^m \cdot \log_2 3}{3^m - 1}.$$

Figure 3:
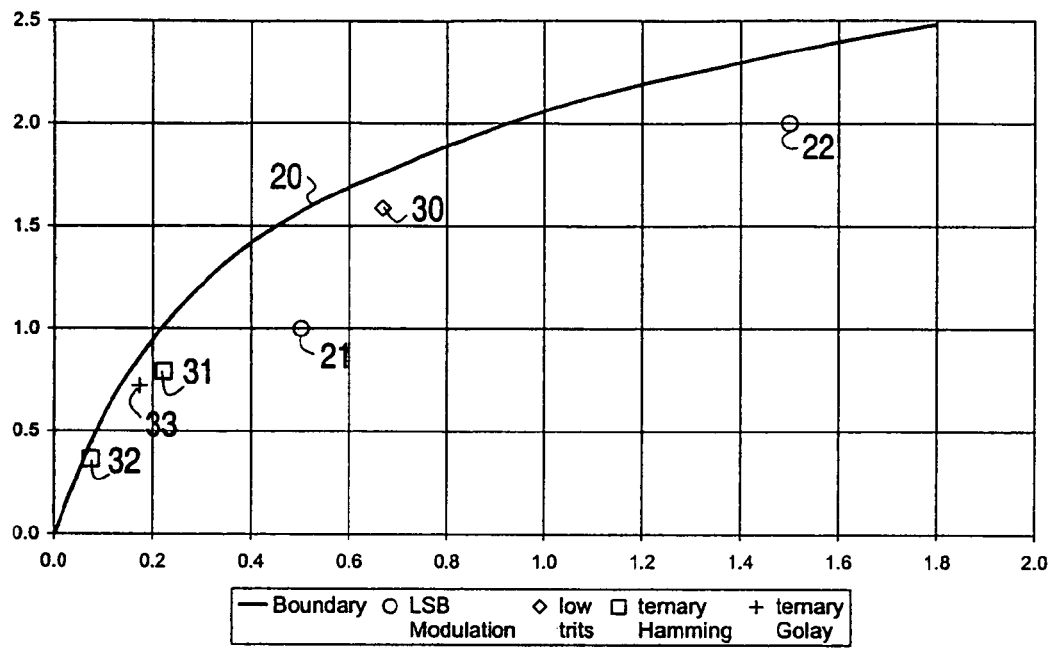

Two (R,D) pairs are indicated by □ signs and denoted 31 (m=2) and 32 (m=3) in FIG. 3.

Again, a Golay code can be used instead of the Hamming code. There is only one ternary Golay code: the (11,6,5) Golay code. This code can embed 11−6=5 ternary symbols in 11 host symbols by modifying max 2 symbols (Hamming distance is 5). Application of the Golay code leads to:

$$R = \frac{5 \log_2 3}{11} \approx 0.72,$$

$$D = \frac{\binom{11}{1} \cdot 1 \cdot 2 + \binom{11}{2} \cdot 2 \cdot 4}{243 \cdot 11} = \frac{42}{243} \approx 0.173, \text{ and}$$

$$R/D \approx 4.169$$

The corresponding (R,D) pair is indicated by the + sign denoted 33 in FIG. 3.

It should be noted that ternary embedding (class=x mod 3) is a special case of more general n-ary embedding (class=x mod n). The previously described LSB embedding is also a special case thereof, viz. n=2. The invention applies to any integer n.

Two-Dimensional Codes

According to a third aspect of the invention, the message symbols are embedded in pairs of host symbols. This is a two-dimensional version of the embedding methods described above. In this coding mode, the two-dimensional symbol space of symbol pairs $(x_a, x_b)$ is "colored" with 5 colors. Each point on the grid denotes a symbol pair, and has a color different from its neighbors. The colors are numbered 0 ... 4, and each color represents a message symbol w∈{0,1,2,3,4}. The following Table IV shows (a part of) the two-dimensional grid.

TABLE IV

| $x_a$ → | | | | | | | | | | | 75 | 76 | | |
|---|---|---|---|---|---|---|---|---|---|---|---|---|---|---|
| $x_b$ | 1 | 2 | 3 | 4 | 0 | 1 | 2 | 3 | 4 | 0 | 1 | 2 | 3 | 4 | 0 |
| ↓ | 4 | 0 | 1 | 2 | 3 | 4 | 0 | 1 | 2 | 3 | 4 | 0 | 1 | 2 | 3 |
| | 2 | 3 | 4 | 0 | 1 | 2 | 3 | 4 | 0 | 1 | 2 | 3 | 4 | 0 | 1 |
| 78 | 0 | 1 | 2 | 3 | 4 | 0 | 1 | 2 | 3 | 4 | 0 | 1 | 2 | 3 | 4 |
| 79 | 3 | 4 | 0 | 1 | 2 | 3 | 4 | 0 | 1 | 2 | 3 | 4 | 0 | 1 | 2 |

The decoder just looks at the color of the received symbol pair $(y_a, y_b)$. The encoder checks whether $(x_a, x_b)$ has the color w to be embedded. If that is not the case, it changes the symbol pair $(x_a, x_b)$ such that the modified pair has the color w. For example, if a message w=4 is to be embedded in host symbol pair $(x_a, x_b)$=(76,79) having color 3, the embedder modifies the symbols into a pair having color 4, e.g. the pair $(y_a, y_b)$= (75,78). The parameters of this embedding scheme are:

$$R = \frac{\log_2 5}{2} \approx 1.16,$$

$$D = \frac{1 \cdot 0 + 4 \cdot 1}{5 \cdot 2} = 0.4, \text{ and}$$

$$R/D \approx 2.90$$

Figure 4:
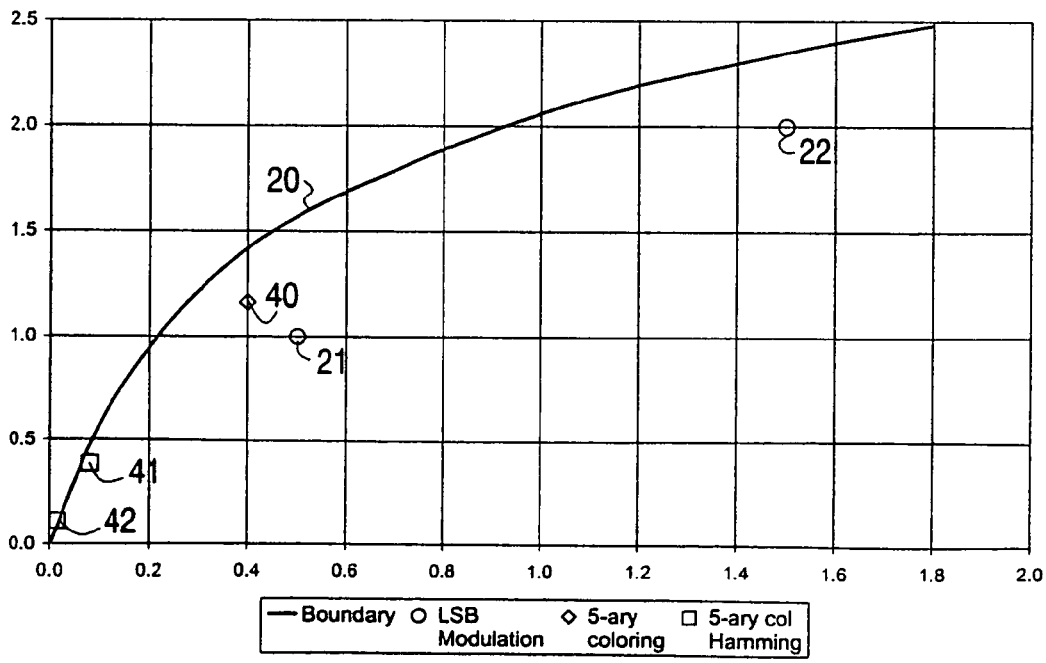

The corresponding (R,D)-pair is shown as a ◇ sign denoted 40 in FIG. 4 (the boundary 20 and LSB modulation parameters 21 and 22 are also shown in this Figure for convenience).

It will be appreciated that the two-dimensional embedding scheme can be extended to more dimensions. In a three-dimensional grid, for example, each point cannot only be "moved" to the four neighbors in the same layer, but also up or down. Seven colors, i.e. seven message symbols, are available in this scheme.

Like the LSB modulation and ternary modulation methods described above, the two-dimensional method can also be "coded" by means of 5-ary Hamming or Golay codes. For a given number m of parity checks, a code length of $(5^m-1)/4$ 5-ary symbols is obtained. The coding scheme processes $(5^m-1)/2$ symbols. Its parameters are:

$$R = \frac{2m \log_2 5}{5^m - 1}, \text{ and}$$

$$D = \frac{2}{5^m}$$

Two of such (R,D) pairs are indicated by □ signs and denoted 41 (m=2) and 42 (m=3) in FIG. 4.

The invention can be summarized as follows. Information signals such as grayscale images or audio signals are represented as a sequence of PCM signal samples. To embed auxiliary data in the signal, the samples are slightly distorted. There is a so-termed "rate-distortion function" (20) which gives the largest embedding rate R given a certain distortion level D. It appears that the efficiency of prior art embedding schemes such as LSB replacement (21,22) can be improved. The invention discloses such embedding schemes (23,24). According to the invention, the signal is divided into groups of L (L>1) signal samples (x). For each group of signal samples, a vector of least significant portions (x mod n) of the signal samples is created. For n=2, the vector comprises the least significant bit of each signal sample. The syndrome of said vector (as defined in the field of error detection and correction) represents the embedded data. Only one (or a few, in any case less than L) signal sample(s) of a group needs to be modified so as to achieve that the vector assumes a desired syndrome value.

The invention claimed is:

1. A method of embedding auxiliary data in an information signal represented by a stream of signal samples, by modifying a least significant portion of selected signal samples in accordance with auxiliary data symbols, the method comprising the steps of:

dividing said stream into groups of signal samples, forming, for each group of signal samples, a vector of symbols representing said least significant portions of the signal samples, modifying signal samples of a group such that the respective vector satisfies given syndrome constraints, the syndrome of said vector representing one or more auxiliary data symbols.

2. A method as claimed in claim 1, wherein said symbols representing least significant portions of the signal samples are x mod n values, where x is the signal sample, n is an integer, and mod represents the remainder after x is divided by n.

3. A method as claimed in claim 1, wherein said symbols representing least significant portion of the signal sample are symbols being assigned to combinations of signal samples in a more-dimensional space, different symbols being assigned to combinations that are neighbors of each other in said space.

4. A method as claimed in claim 1, wherein the syndrome of said vector is determined by multiplying said vector with a given matrix.

5. An arrangement for embedding auxiliary data in an information signal represented by a stream of signal samples, comprising means for modifying a least significant portion of selected signal samples in accordance with auxiliary data symbols, said modifying means being arranged to:

divide said stream into groups of signal samples, form, for each group of signal samples, a vector of symbols representing said least significant portions of the signal samples, modify signal samples of a group such that the respective vector satisfies given syndrome constraints, the syndrome of said vector representing one or more auxiliary data symbols.

6. A method of detecting auxiliary data embedded in an information signal represented by a stream of signal samples by modifying a least significant portion of selected signal samples in accordance with auxiliary data symbols, the method comprising the steps of:

dividing said stream into groups of signal samples, forming, for each group of signal samples, a vector of symbols representing said least significant portions of the signal samples, determining the syndrome of said vector, said syndrome representing one or more auxiliary data symbols.

7. A method as claimed in claim 6, wherein said symbols representing least significant portions of the signal samples are x mod n values, where x is the signal sample, n is an integer, and mod represents the remainder after x is divided by n.

8. A method as claimed in claim 6, wherein said symbols representing least significant portion of the signal sample are symbols being assigned to combinations of signal samples in a more-dimensional space, different symbols being assigned to combinations that are neighbors of each other in said space.

9. A method as claimed in claim 6, wherein said step of determining the syndrome of a vector comprises multiplying said vector with a given matrix.

10. An arrangement for detecting auxiliary data embedded in an information signal represented by a stream of signal samples by modifying a least significant portion of selected signal samples in accordance with auxiliary data symbols, the arrangement comprising means being arranged to:

divide said stream into groups of signal samples, form, for each group of signal samples, a vector of symbols representing said least significant portions of the signal samples, determine the syndrome of said vector, said syndrome representing one or more auxiliary data symbols.

* * * * *